(12) United States Patent
Rapchak

(10) Patent No.: US 9,303,813 B2
(45) Date of Patent: Apr. 5, 2016

(54) APPARATUS AND METHOD FOR COOLING AND LUBRICATION

(71) Applicant: Nex Flow Air Products Corp., Richmond Hill (CA)

(72) Inventor: Leslie Frank Rapchak, Tillsonburg (CA)

(73) Assignee: Nex Flow Air Products Corp., Ontario ( * ) Notice: Subject to any disclaimer, the term of this patent is extended or adjusted under 35 U.S.C. 154(b) by 228 days.

(21) Appl. No.: 13/947,726

(22) Filed: Jul. 22, 2013

(65) Prior Publication Data

US 2014/0027531 A1    Jan. 30, 2014

(30) Foreign Application Priority Data

Jul. 27, 2012  (CA) ...................................... 2784109

(51) Int. Cl.
| | |
|---|---|
| *F16N 5/02* | (2006.01) |
| *F16N 7/32* | (2006.01) |
| *F16N 7/34* | (2006.01) |
| *B05B 1/30* | (2006.01) |
| *B05B 7/04* | (2006.01) |
| *B05B 15/06* | (2006.01) |

(52) U.S. Cl.
CPC ................ *F16N 5/02* (2013.01); *B05B 1/3013* (2013.01); *B05B 7/0483* (2013.01); *B05B 15/066* (2013.01); *F16N 7/32* (2013.01); *F16N 7/34* (2013.01)

(58) Field of Classification Search
CPC .......... B23Q 11/10; F16N 5/02; B05B 7/0483
USPC ................................................ 184/55.1, 6.26
See application file for complete search history.

(56) References Cited

U.S. PATENT DOCUMENTS

| | | | | |
|---|---|---|---|---|
| 3,106,346 | A | * | 10/1963 | Thomas ......................... 239/366 |
| 3,515,676 | A | | 6/1970 | Hierta et al. |

(Continued)

FOREIGN PATENT DOCUMENTS

| | | |
|---|---|---|
| DE | 3743968 | 12/1988 |
| EP | 1961487 | 8/2008 |

(Continued)

OTHER PUBLICATIONS

"Magugliani Exair, Combined Cooling Systems and Tools Minimal Lubrication," available, on information and belief, at least as early as Oct. 2011 (2 pages).

(Continued)

*Primary Examiner* — Michael Mansen
*Assistant Examiner* — Mark K Buse
(74) *Attorney, Agent, or Firm* — Workman Nydegger

(57) ABSTRACT

A method, device, and nozzle for dispensing cooled lubricant is provided. Lubricant is supplied to the nozzle through an inner lubricant tube. Cooled compressed gas is also supplied to the nozzle through a conduit which surrounds the inner lubricant tube. Cooled compressed gas from the conduit is introduced into a nozzle gas bore in the nozzle and lubricant is introduced into a nozzle lubricant bore in the nozzle. The cooled compressed gas and the lubricant are mixed at a junction between these bores, such that the lubricant is siphoned into the junction by the cooled compressed gas. The mixture of cooled compressed gas and lubricant are then dispensed from an aperture in the nozzle, preferably as a fine atomized mist of cooled lubricant.

18 Claims, 4 Drawing Sheets

(56) References Cited

U.S. PATENT DOCUMENTS

| | | | | |
|---|---|---|---|---|
| 3,759,449 | A | | 9/1973 | Ruthman et al. |
| 4,919,232 | A | | 4/1990 | Lofton |
| 5,197,569 | A | | 3/1993 | Roessler et al. |
| 5,226,506 | A | * | 7/1993 | Link .......................... 184/6.26 |
| 5,948,968 | A | * | 9/1999 | Ehlert .......................... 73/30.04 |
| 6,290,024 | B1 | * | 9/2001 | Ehlert .......................... 184/6.26 |
| 8,881,871 | B2 | * | 11/2014 | Divisi .......................... 184/55.1 |
| 2011/0120803 | A1 | | 5/2011 | Divisi |

FOREIGN PATENT DOCUMENTS

| | | |
|---|---|---|
| GB | 889602 | 2/1962 |
| GB | 920761 | 3/1963 |
| GB | 959830 | 6/1964 |
| GB | 979059 | 1/1965 |
| GB | 2075134 | 11/1981 |

OTHER PUBLICATIONS

Website pages from: http://web.archive.org/web/20070227144031/ http://www.magugliani.it/lubrorefrigerazione.htm, published and available, on information and belief, at least as early as Feb. 27, 2007; and English translation (14 pages).

Website pages from: http://web.archive.org/web/20120707041118/ http://www.magugliani.it/lubrorefrigerazione.htm, published and available, on information and belief, at least as early as Jul. 7, 2012; and partial English translation (4 pages).

Website pages from: http://www.magugliani.it/lubrorefrigerazione. htm, published and available, on information and belief, at least as early as Jul. 22, 2013 (2 pages).

Extended European Search Report from European Application No. 13177730.2 dated Nov. 18, 2013 (5 pages).

* cited by examiner

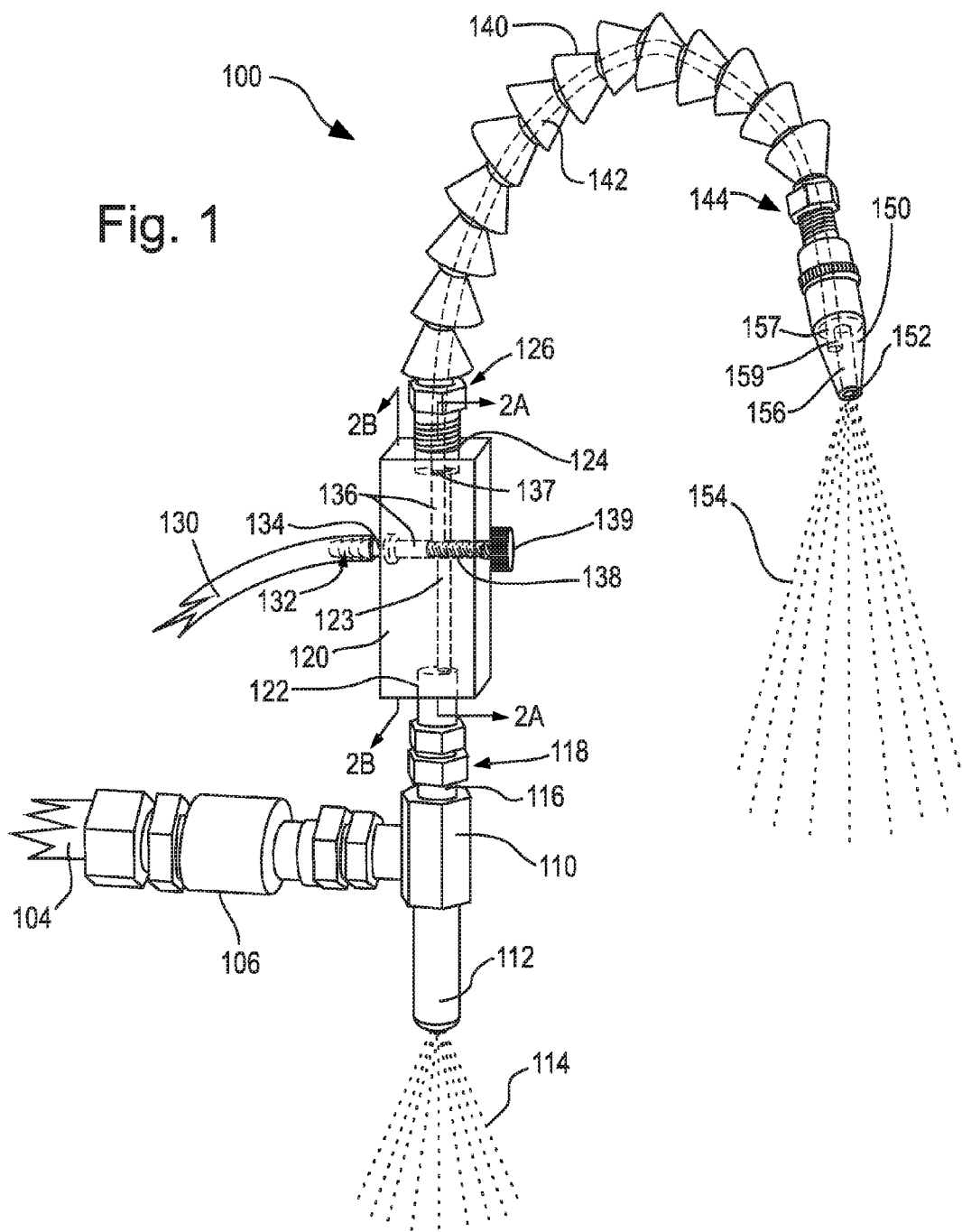

APPARATUS AND METHOD FOR COOLING AND LUBRICATION

CROSS-REFERENCE TO RELATED APPLICATIONS

This non-provisional patent application claims foreign priority to and the benefit of Canadian Patent Application No. 2,784,109 filed Jul. 27, 2012 entitled Apparatus and Method for Cooling and Lubrication, which is incorporated herein by reference.

FIELD OF THE INVENTION

The present invention is directed to the field of cooling and lubricating surfaces. More particularly, the present invention is directed toward a method, device, and nozzle for applying cooled lubricant to a surface using cooled compressed gas, such as compressed air cooled by a vortex tube.

BACKGROUND OF THE INVENTION

For years, compressed air has been utilized to spray lubricant on surfaces. Systems incorporating compressed air to blast lubricant or oil are known in the art. For example, Auto Research Corporation disclosed in U.S. Pat. No. 3,106,346 a lubricant or coolant distribution system for dispensing an air/liquid mixture. The Ruthman Machinery Company introduced a means for controlling the amount of coolant distributed in U.S. Pat. No. 3,759,449.

An improvement that has been introduced to lubricant spray systems is a mechanism for cooling the lubricant so as to limit the amount of lubricant that is sprayed upon a heated surface. U.S. Pat. No. 3,515,676 of Eaton Yale & Towne Inc. discloses a vortex chamber for accelerating fluid and aspirating lubricant. A vortex tube is incorporated into U.S. Pat. No. 4,919,232 to cool the air stream that mixes with the lubricant.

Link's U.S. Pat. No. 5,226,506 discloses multiple mixer heads to produce the air/lubricant mixture. U.S. Pat. No. 6,290,024 of Lubrication Systems Company of Texas, Inc. incorporates multiple oil reservoirs and multiple mist generators that are alternatively activated and deactivated. The system also incorporates a heater manifold that heats the oil before it is combined with the pressurized air.

U.S. patent application No. 2011/0120803 of Dropsa S.p.A. discloses a lubrication device incorporating a lubricant reservoir and a pump that feeds lubricant into a modular element. The device also incorporates a vortex tube to cool the compressed air with which the lubricant is mixed.

Finally, the website located at the URL http://www.magugliani.it/lubrorefrigerazione.htm discloses a lubricant system that incorporates a vortex tube and lubricant pump that introduces lubricant into the system.

SUMMARY OF THE INVENTION

As mentioned above, systems for applying lubricant to surfaces are known in the art. Generally, such systems mix compressed air with the lubricant, thus atomizing the lubricant for application upon the surface. Frequently, such surfaces are hot and thus the lubricant is also applied to cool them. Less lubricant is required if the lubricant has been cooled and thus it is known to incorporate a vortex tube to cool the compressed air.

Many of the prior art systems employ a lubricant pump to introduce lubricant into the system. Such pumps add to the complexity, cost, and energy consumption of these units. Alternatively, the lubricant reservoir can be orientated above the application device so as to ensure a constant supply of lubricant. Such gravity-fed systems can only be installed where conditions allow, and the supply of lubricant is limited by the viscosity of the fluid and the size of the lubricant supply line.

Accordingly, there is a need in the art for providing a simplified and inexpensive lubricating system which can operate in a cost-effective manner in a variety of installations. The present invention satisfies this need by relying on siphoning action caused by the cooled compressed air generated by a vortex tube.

In one aspect of the invention, there is provided a device for dispensing cooled lubricant. The device includes a nozzle for dispensing a mixture of cooled compressed gas and lubricant. An inner lubricant tube carries lubricant from a source of lubricant to the nozzle via a siphon action. A conduit surrounds the inner lubricant tube and carries cooled compressed gas from a source of cooled compressed gas to the nozzle. The nozzle includes a nozzle gas bore for receiving compressed gas from the conduit and a nozzle lubricant bore for receiving lubricant from the inner lubricant tube. These bores meet at a junction, which produces a mixture of cooled compressed gas and lubricant. This mixture is then dispensed through an aperture of the nozzle, preferably as an atomized mist of cooled lubricant.

A further embodiment of the invention includes a nozzle for dispensing cooled lubricant. The nozzle includes a nozzle gas bore for receiving cooled compressed gas and a nozzle lubricant bore for receiving cooled lubricant. These bores meet at a junction, which produces a mixture of cooled compressed gas and lubricant. This mixture is then dispensed through an aperture of the nozzle, preferably as an atomized mist of cooled lubricant.

In a further embodiment of the invention, a method for dispensing cooled lubricant through a nozzle is provided. The first step of the method involves supplying lubricant to the nozzle through an inner lubricant tube. Cooled compressed gas is also supplied to the nozzle through a conduit which surrounds the inner lubricant tube. The cooled compressed gas from the conduit is introduced into a nozzle gas bore in the nozzle and the lubricant is introduced into a nozzle lubricant bore in the nozzle. The cooled compressed gas and the lubricant are mixed at a junction between these bores, such that the lubricant is siphoned into the junction by the cooled compressed gas. The mixture of cooled compressed gas and lubricant are then dispensed from an aperture in the nozzle, preferably as a fine atomized mist of cooled lubricant.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

Exemplary embodiments of the present invention will now be described by reference to the following figures, in which identical reference numbers in different figures indicate identical elements and in which:

FIG. 1 shows a perspective view of a lubrication device according to one embodiment of the invention, with internal components shown in dashed lines;

DETAILED DESCRIPTION

Figure 2C:
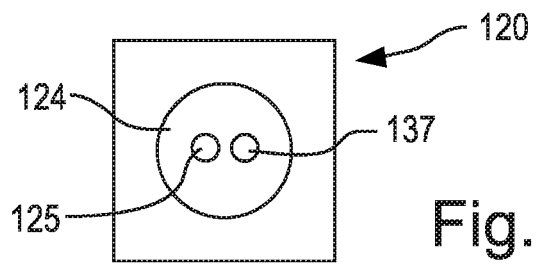
FIG. 2C shows a top view of the housing portion of the embodiment shown in FIG. 1.
Figure 2A:
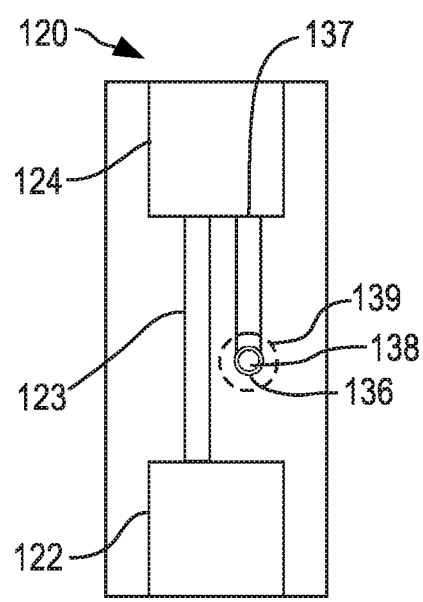
FIG. 2A shows a cross-sectional view of the housing portion of the embodiment shown in FIG. 1, taken along plane 2A of FIG. 1.
Figure 2B:
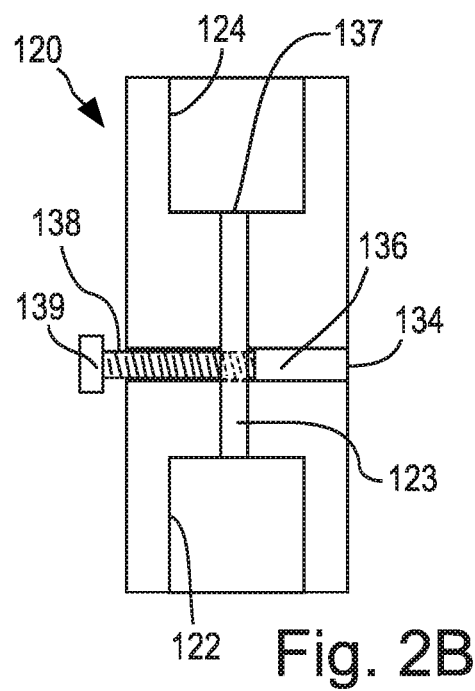
FIG. 2B shows a cross-sectional view of the housing portion of the embodiment shown in FIG. 1, normal to that of FIG. 2A, taken along plane 2B of FIG. 1.
Figure 2D:
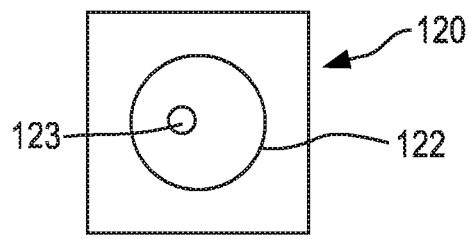
FIG. 2D shows a bottom view of the housing portion of the embodiment shown in FIG. 1.

An example lubrication device 100 according to a preferred embodiment of the present invention is shown FIG. 1. As described in further detail below, the lubrication device is comprised of a valve body 120 connected to a conduit 140, which in turn is connected to a nozzle 150. An inner lubricant tube 142 (See FIG. 3A) is also disposed within the conduit 140 and extends from the valve body 120 to the nozzle 150. In the embodiment shown in FIG. 1, lubricant is supplied from a lubricant supply line 130 and cooled compressed gas is supplied by a vortex tube 110. Lubricant passes from the lubricant supply line 130, through the valve body 120 to a lubricant outlet 137 connected to the inner lubricant tube 142 and onward to the nozzle 150. Cooled compressed gas passes from the vortex tube 110 through the valve body 120 and the conduit 140 to the nozzle 150. The conduit 140 surrounds the inner lubricant tube 142, thereby causing the cooled compressed gasses to cool the lubricant as it travels along the inner lubricant tube 142. The lubricant and the cooled compressed gas are then mixed at the nozzle 150 and dispensed as a cooled lubricant spray 154. A siphon action in the nozzle 150 draws the lubricant from the supply line 130 and through the inner lubricant tube 142.

The supply of cooled compressed gas is provided to the lubrication device 100 shown in FIG. 1 by a vortex tube 110. In other embodiments, cooled compressed gas is provided to the lubrication device 100 by a pre-cooled gas line under pressure, a chilled pressurized cylinder, or another suitable type of chilling or refrigeration system. As seen in FIG. 1, a compressed gas line 104 is connected to the vortex tube 110 via a fitting 106. Various types of vortex tube 110 are commercially available. In the present embodiment, the vortex tube 110 is a FRIGID-X™ Vortex Tube Mini Cooler from Nex Flow Air Products Corporation (Toronto, Ontario, Canada) fitted with a fixed hot end plug. Various other brands, styles and capacities of vortex tube can also be used to supply cooled compressed air to the lubrication device 100, including versions which involve additional parts such as protective sleeves at the hot gas outlet 112 to prevent touching of the hot end of the vortex tube 110. Compressed gas from the compressed gas line 104 enters the vortex tube 110 and is separated by the vortex tube 110 into compressed hot and cold gas streams. The hot gas stream 114 is vented at the hot gas outlet 112, whereas the cold gas stream exits the vortex tube 110 at the cold gas outlet 116. In some embodiments, the temperatures and capacities of the gas streams can be varied by adjusting the hot end plug of the vortex tube 110 or by using different "generators". In the embodiment shown in FIG. 1, the hot end plug and the generator on the vortex tube 110 are fixed at 50 psig, so as to limit compressed air consumption and avoid freezing of the lubricant within the inner lubricant tube 142. Higher pressures increase energy consumption and may make it more difficult to prevent freezing of the lubricant in the inner lubricant tube 142. A non-adjustable vortex tube 110 also provides extra protection against inadvertent changes to the temperature and volume of the cold compressed gas supply during use.

The compressed gas used in the lubrication device 100 shown in FIG. 1 is compressed air. Other gases may also be used depending on the particular application. For example, in some embodiments, an inert gas such as nitrogen, helium, argon, or combinations thereof may be used to provide a cooled lubricant mix which is substantially free of oxygen or other chemically reactive gasses. Mixtures of compressed air and other gasses can also be used. Compressed air is a preferred gas in many applications, as it is the most cost-effective.

The lubricant used in the lubrication device 100 shown in FIG. 1 is water based. Other lubricants may also be used depending on the particular application. For example, in some embodiments, various natural and synthetic oils can be used as the lubricant. In other embodiments, water-soluble polymers are used to provide lubrication. In still other embodiments where cost is particularly important, the lubricant can be water. Various other suitable lubricants are known in the art. Water soluble lubricants are preferred in many applications as this tends to prevent gelling or clogging of the lubrication device 100.

In the lubrication device 100 shown in FIG. 1, the compressed cooled gas enters the valve body 120 at a gas inlet 122. As seen in FIGS. 2A to 2D, the gas inlet 122 is in fluid communication with a valve body gas bore 123, which carries the compressed cooled gas from the gas inlet 122 through the valve body 120 and to the gas outlet 125 housed within the valve body outlet 124. As seen in FIG. 1, the valve body outlet 124 is connected to a conduit 140 via a suitable fitting 126, such that gas exiting the gas outlet 125 enters the conduit 140 via the valve body outlet 124 and is transported toward the nozzle 150.

In other embodiments, a gas valve (not shown) is installed on the valve body gas bore 123 to regulate the flow of gas through the valve body 120 to the conduit 140. In still other embodiments, the compressed cooled gas is supplied by the vortex tube 110 (or other source) directly to the conduit 140 without passing through the valve body 120 at all.

Lubricant is supplied to the lubrication device 100 shown in FIG. 1 by a lubricant supply line 130. In the present embodiment, the lubricant supply line 130 is made of clear PVC tubing having an inner diameter of ⅛" and an outer diameter of ¼". In other embodiments, the lubricant is supplied directly from a reservoir. The lubricant supply line 130 is connected to the lubricant inlet 134 of the valve body 120 via a suitable fitting 132. As seen in FIGS. 2A to 2D, the lubricant passes from the lubrication inlet 134, through a valve body lubrication bore 136 to a lubricant outlet 137 housed within the valve body outlet 124. The inner lubrication tube 142 is connected to the lubricant outlet 137 and provides fluid communication with the nozzle 150.

In lubrication device 100 shown in FIG. 1, a valve 138 is positioned on the valve body lubrication bore 136 to control the flow of lubricant through the valve body 120. In the present embodiment, the valve 138 is a brass screw which can be raised or lowered into the valve body lubrication bore 136 by turning an adjustment knob 139. This permits the flow of lubricant to be adjusted from 100% to 0% and various intermediate points there between. Other types of valve may also be used, including shut off valves or any other fluid regulating device, including valves which intermittently release short bursts of lubricant. In other still other embodiments, the valve 138 may be external to the valve body 120 or may be situated on the lubricant supply line 104.

In some embodiments, the valve body 120 is not present at all and lubricant passes directly from the lubricant supply line 130 (or other source) to the inner lubricant tube 142. In the lubrication device 100 shown in FIGS. 1 and 2A-2D, the valve body 120 is milled from a 1"×1"×2" solid aluminium block. A variety of other materials known in the art may be used to create a valve body 120 having a similar structure and function as the valve body 120 in FIGS. 2A-2D, such as brass, stainless steel, various plastics, cast iron, other types of aluminium, or any other material suitable for liquid or gas handling. In this embodiment, the gas inlet 122 is a ¼"-18 NPT female connector, the valve body outlet 124 is a ⅜"-18 NPT female connector, the lubrication inlet 134 mates with a barb-style fitting 132, the valve body gas bore 123 is 0.185" in diameter, and the valve body lubricant bore 136 has a diameter of 0.185". A variety of other dimensions can be used; however, it is preferable that the valve body gas bore 123 and the valve body lubricant bore 136 be of approximately the same diameter (i.e. within 10% of one another). In an even more preferable embodiment, the valve body gas bore 123 and the valve body lubricant bore 136 have the exact same diameter.

The conduit 140 is connected to the valve body 120 at the valve body outlet 124 by a suitable fitting 126. In the embodiment shown in FIG. 1, the conduit 140 is preferably flexible so as to permit the nozzle 150 to be positioned and remain near the tool or other surface being lubricated. In the embodiment shown in FIG. 1, the conduit 140 is a LOC-LINE™ hose (Lockwood Products, Lake Oswego, Oreg., USA) comprised of a plurality of links providing a flexible conduit having a nominal inner diameter of 0.5" and an outer diameter ranging from 0.840" to 0.985". Preferably, the inner diameter of the conduit 140 is at least double that of the outer diameter of the inner lubricant tube 142.

Various other types of tubing can also be used to create a suitable conduit 140, including non-jointed tubing or flexible tubing that does not retain its shape and therefore requires clips or other securing means to be positioned. Rigid tubing can also be used to create the conduit 140, particularly in applications where the nozzle 150 is unlikely to be repositioned. The conduit 140 can also be made in a variety of lengths depending on the application.

In the lubrication device 100 shown in FIG. 1, the conduit 140 receives cooled compressed from the gas outlet 125 in the valve body outlet 124 and carries cooled compressed gas to the nozzle 150. In other embodiments, the conduit 140 is connected directly to the source of cooled compressed gas rather than to the valve body 120.

The inner lubricant tube 142 is located within the conduit 140 and provides fluid communication between the lubricant outlet 137 in the valve body outlet 124 and the nozzle 150. Preferably, the inner lubricant tube 142 is at least as flexible as the conduit 140 to prevent damage to the inner lubricant tube 142. The inner lubricant tube 142 is preferably attached to the lubricant outlet 137 in a permanent or semi-permanent manner to prevent the inner lubricant tube 142 from becoming dislodged during use. In the embodiment shown in FIG. 1, the inner lubricant tube 142 is made of clear PVC tubing having an inner diameter of 0.125" and an outer diameter of 0.1875". In this embodiment, one end of the inner lubricant tube 142 is held in place at the lubricant outlet 137 using glue and the other end is inserted into the nozzle lubricant bore 157. Preferably, the outer diameter of the inner lubricant tube 142 is at least half of the inner diameter of the conduit 140. Other suitable materials such as rubber, latex, coiled metal tubing, or other types of plastic may also be used.

In the lubrication device 100 shown in FIG. 1, the inner lubricant tube 142 receives lubricant from the lubricant outlet 137 in the valve body outlet 124 and carries lubricant to the nozzle 150. The flow of cooled gas around the inner lubricant tube 142 within the conduit 140 acts to cool to the lubricant as it is carried to the nozzle 150. Such cooling of the lubricant is advantageous for dissipating heat at the site of application of the lubricant, provided that the cooling is not so great as to cause the lubricant to freeze.

Figure 3A:
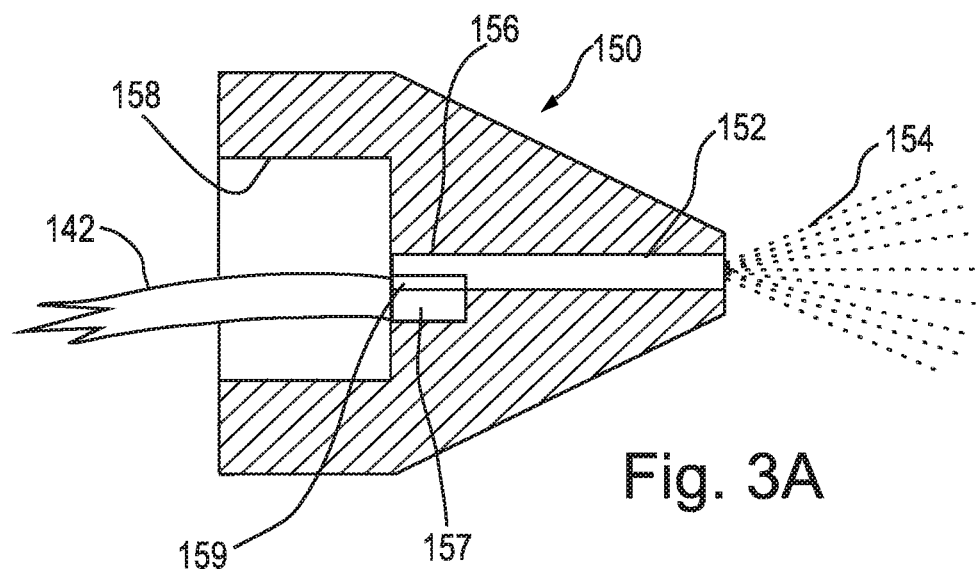
FIG. 3A shows a side view of the nozzle portion and inner lubricant tube of the embodiment shown in FIG. 1, partially broken away and with dashed lines depicting the internal components of the nozzle.
Figure 3B:
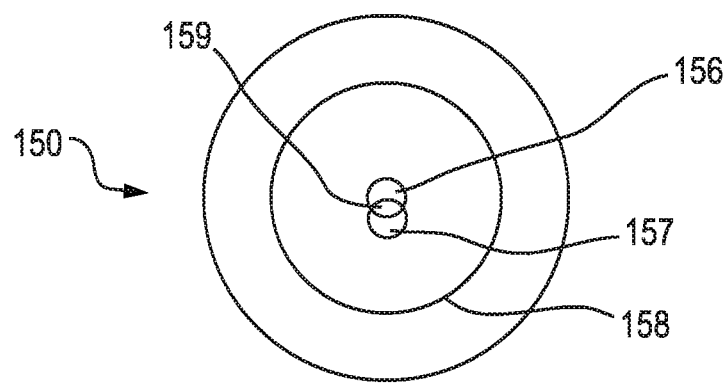
FIG. 3B shows a rear view of the nozzle portion of the embodiment shown in FIG. 1.
Figure 3C:
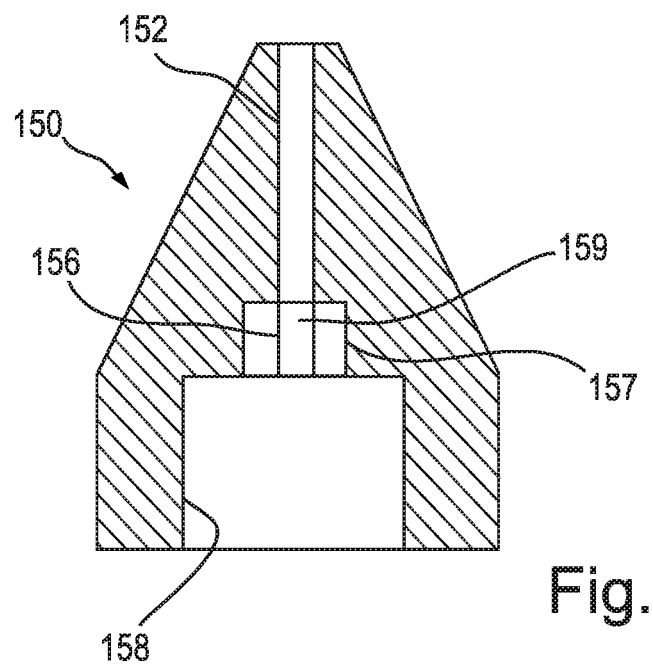
FIG. 3C shows a plan view of the nozzle portion of the embodiment shown in FIG. 1, with dashed lines depicting the internal components of the nozzle.

The nozzle 150 is connected to the conduit 140 via a fitting 144. As can be seen in FIGS. 3A to 3C, the nozzle 150 comprises a nozzle inlet 158 which receives the conduit 140 and the inner lubricant tube 142. Cooled compressed gasses in the conduit 140 enter the nozzle 150 through a nozzle gas bore 156 and exit at an aperture 152. Lubricant in the inner lubricant tube 142 enters the nozzle 150 at a lubricant nozzle bore 157, which joins with the nozzle gas bore 156 at a junction 159. The cooled compressed gas and the cooled lubricant mix at the junction 159 and this mixture is dispensed from the aperture 152 of the nozzle 150.

In the embodiment shown in FIGS. 3A to 3C, the nozzle gas bore 156 is a cylindrical bore approximately 0.120" in diameter and leads to the aperture 152. In this embodiment, the nozzle lubricant bore 157 is a cylindrical bore approximately 0.185" in diameter and approximately 0.3" deep which is substantially parallel to the nozzle gas bore 156. In this embodiment, the center of the nozzle gas bore 156 and the nozzle lubricant bore 157 are offset from one another by approximately 0.130", resulting in parallel overlapping bores. In other embodiments, both the nozzle gas bore 156 and the nozzle lubricant bore 157 can be non-cylindrical bores or bores of various dimensions.

In the embodiment shown in FIGS. 3A to 3C, the nozzle lubricant bore 157 is of sufficient diameter to receive the inner lubricant tube 142, which is inserted into the nozzle lubricant bore 157. It is preferable that the nozzle gas bore 156 and the inner diameter of the inner lubricant tube 142 be of approximately the same diameter (i.e. within 10% of one another). In addition, it is preferable that the nozzle gas bore 156 be at least 2 fold smaller than the conduit 140, so as to increase the speed of the gas as it approaches the junction 159, which enhances the siphon effect. More preferably, the nozzle gas bore 156 is between 3 to 4.5 fold smaller than the conduit 140.

Figure 4:
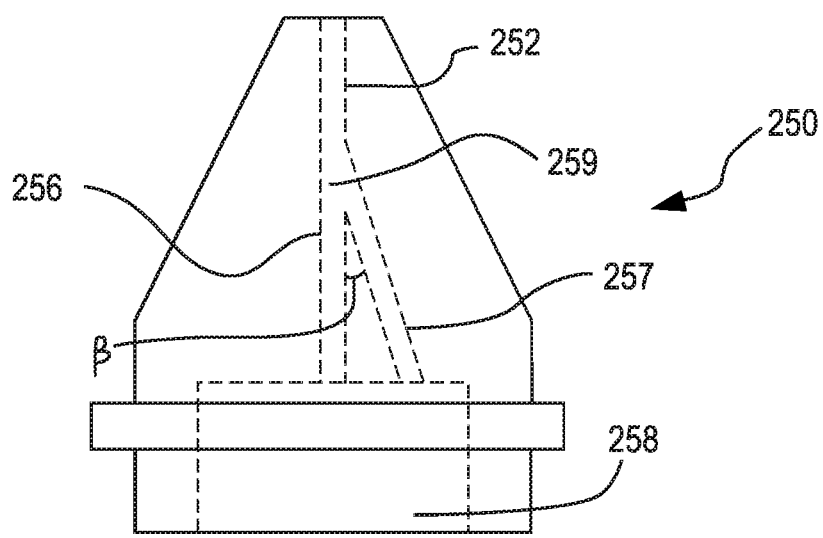
FIG. 4 shows a side view of a nozzle portion of another embodiment of the invention on a similar plane as FIG. 3A, with dashed lines depicting the internal components of the nozzle.

In the embodiment shown in FIGS. 3A to 3C, the nozzle gas bore 156 and the nozzle lubricant bore 157 are substantially parallel and meet at a junction 159 formed by an overlap between the bores. In the embodiment shown in FIG. 4, the nozzle gas bore 256 and the nozzle lubricant bore 257 intersect and the junction 259 is formed at an acute angle β.

Preferably, the angle β is between 5° and 35°, more preferably between 10° and 20°, and most preferably at 12°. In still other embodiments, the junction 259 between the nozzle gas bore 256 and the nozzle lubricant bore 257 is formed at a right angle.

The movement of cooled compressed gas over the junction 159 creates a siphon effect whereby lubricant is drawn up the inner lubricant tube 142 and into the junction 159. Fluid communication between the nozzle lubricant bore 157 and the lubricant supply line 130 (or other source of lubricant) ensures a continuous supply of lubricant to the junction 159. The siphon effect thereby eliminates the need for complex or costly pumps, which reduces the cost of manufacturing the lubrication device 100 and eliminates additional points of mechanical failure.

The mixture of cooled compressed gas and lubricant created at the junction 159 is expelled from the aperture 152 of the nozzle 150 as a cooled lubricant spray 154. Preferably, the resulting cooled lubricant spray 154 is an atomized mist. Such atomized mists adhere more evenly to the lubrication site. Atomized mists also present greater surface area for heat exchange between the cooled lubricant and the lubrication site, which is often hot as a result of frictional forces.

As discussed above, a number of fittings 106, 118, 126, 132, 144 are used in association with the lubrication device 100, the vortex tube 110, the compressed gas line 104, and the lubrication supply line 130 shown in FIG. 1. These fittings can be of any suitable type for the gas or lubricant, as the case may be. A number of such fittings are known in the art, including male-male NPT and NOT fittings as well as barb-style tubing connectors. In other embodiments the connections mediated by these fittings can be direct, thereby eliminating one or more fittings entirely. Accordingly, a person of skill will understand that various suitable fittings can be used and that their presence is optional.

In operation, a source of cooled compressed gas is supplied to the lubrication device 100. In some embodiments, the source of cooled compressed gas is a compressed gas line 104 connected to a vortex tube 110. The cooled compressed gas enters a flexible conduit 140 that transports the cooled compressed gas to the nozzle 150. In some embodiments, the cooled compressed gas passes through a valve body gas bore 123 in the valve body 120 before it reaches the conduit 140. At the nozzle 150, the cooled compressed air enters a nozzle gas bore 157, which is preferably 2 to 3.5× smaller than the conduit 140.

A source of lubricant is also supplied to the lubrication device 100. In some embodiments, the source of lubricant is a lubricant supply line 130 connected to a lubricant reservoir (not shown). The lubricant enters the inner lubricant tube 140 within the conduit that transports the lubricant to the nozzle 150. In some embodiments, the flow of lubricant is regulated by a valve 138 situated on a valve body lubricant bore 136 in a valve body 120 before it reaches the inner lubricant tube 142. The cooled compressed air passing through the conduit 140 cools the lubricant in the inner lubricant tube 142 as the lubricant is transported to the nozzle 150. At the nozzle 150, the lubricant enters a nozzle lubricant bore 157 which joins the nozzle gas bore 157 at a junction 159.

A siphon effect is created at the junction 159, which draws the lubricant up the inner lubricant tube 142 and into the flow of cooled compressed gas passing through the nozzle gas bore 156. The mixture of cooled compressed air and lubricant is dispensed from the nozzle 150 at the aperture 152 as a cooled lubricant spray 154. The lubrication device 100 thereby dispenses cooled lubricant at the lubrication site in a cost-effective and reliable manner, thereby eliminating the need for costly pumps and increasing the reliability of the unit.

It will be seen that the present invention has been described by way of preferred embodiments of various aspects of the invention. However, it would be understood that one skilled in the art may readily depart from the embodiments described in detail herein, while still remaining within the scope of the invention as defined in this patent specification as a whole including the claims thereto. It will be further understood that structural or functional equivalents of elements described herein are considered to within the scope of the invention, as well as departures from any directional references, dimensions or configurations described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device for dispensing cooled lubricant comprising:
   a nozzle for dispensing a mixture of cooled compressed gas and lubricant;
   an inner lubricant tube in fluid communication with a source of lubricant, wherein the inner lubricant tube transports lubricant to the nozzle via a siphon action;
   a conduit surrounding the inner lubricant tube and in fluid communication with a source of cooled compressed gas, wherein the conduit transports cooled compressed gas to the nozzle;
   wherein the nozzle includes:
   a nozzle gas bore for receiving cooled compressed gas from the conduit,
   a nozzle lubricant bore for receiving lubricant from the inner lubricant tube,
   a junction at which the nozzle lubricant bore joins the nozzle gas bore to produce the mixture of cooled compressed gas and lubricant, and
   an aperture through which the mixture of cooled compressed gas and lubricant is dispensed;
   wherein the nozzle gas bore and the nozzle lubricant bore are substantially parallel, the center of the nozzle gas bore and the center of the nozzle lubricant bore are offset from one another, and the junction is formed by a partial overlap between the nozzle lubricant bore and the nozzle gas bore; and
   wherein, in use, the cooled lubricant is siphoned into the junction by the cooled compressed gas.

2. The device of claim 1, wherein the diameter of the conduit is greater than the diameter of the nozzle gas bore.

3. The device of claim 2, wherein the diameter of the conduit is between 2 and 4.5 fold greater than the diameter of the nozzle gas bore.

4. The device of claim 1, wherein the diameter of the nozzle gas bore is between 90% and 110% of the inner diameter of the inner lubricant tube.

5. The device of claim 1, wherein the source of cooled compressed gas is a vortex tube.

6. The device of claim 1, wherein the cooled compressed gas is at least one of air, nitrogen, helium, and argon.

7. The device of claim 1 further comprising
   a valve in fluid communication with the source of lubricant and the inner lubricant tube for regulating the flow of lubricant to the nozzle; and a valve body having a valve body lubricant bore in fluid communication with the source of lubricant and the inner lubricant tube, the valve being positioned on the valve body lubricant bore.

8. The device of claim 7, wherein the valve body further comprises a valve body gas bore in fluid communication with the source of cooled compressed gas and the conduit and the diameter of the valve body lubricant bore is between 90% and 110% of the diameter of the valve body gas bore.

9. A nozzle for dispensing cooled lubricant comprising:
a nozzle gas bore for receiving cooled compressed gas from a source of cooled compressed gas,
a nozzle lubricant bore for receiving cooled lubricant from a source of cooled lubricant,
a junction at which the nozzle lubricant bore joins the nozzle gas bore to produce the mixture of cooled compressed gas and cooled lubricant, and
an aperture through which the mixture of cooled compressed gas and cooled lubricant is dispensed;
wherein the nozzle gas bore and the nozzle lubricant bore are substantially parallel, the center of the nozzle gas bore and the center of the nozzle lubricant bore are offset from one another, and the junction is formed by a partial overlap between the nozzle lubricant bore and the nozzle gas bore; and
wherein, in use, the cooled lubricant is siphoned into the junction by the cooled compressed gas.

10. The nozzle of claim 9, wherein the diameter of the nozzle gas bore is between 90% and 110% of the inner diameter of the inner lubricant tube.

11. The nozzle of claim 9, wherein the source of cooled lubricant is an inner lubricant tube surrounded by a conduit in fluid communication with the source of cooled compressed gas.

12. The nozzle of claim 11, wherein the diameter of the conduit is greater than the diameter of the nozzle gas bore.

13. The nozzle of claim 12, wherein the diameter of the conduit is between 2 and 4.5 fold greater than the diameter of the nozzle gas bore.

14. The nozzle of claim 11, wherein the outer diameter of the inner lubricant tube is at most half of the inner diameter of the conduit.

15. The nozzle of claim 9, wherein the source of cooled compressed gas is a vortex tube.

16. A method for dispensing cooled lubricant through a nozzle, the method comprising the steps of:
supplying lubricant to the nozzle through an inner lubricant tube;
supplying cooled compressed gas to the nozzle through a conduit surrounding the inner lubricant tube;
introducing the cooled compressed gas from the conduit into a nozzle gas bore in the nozzle;
introducing lubricant from the inner lubricant tube into a nozzle lubricant bore in the nozzle;
mixing the cooled compressed gas and lubricant at a junction between the nozzle lubricant bore and the nozzle gas bore, wherein the nozzle gas bore and the nozzle lubricant bore are substantially parallel, the center of the nozzle gas bore and the center of the nozzle lubricant bore are offset from one another, and the junction is formed by a partial overlap between the nozzle lubricant and the nozzle gas bore, such that the lubricant is siphoned into the junction by the cooled compressed gas; and
dispensing the mixture of cooled compressed gas and lubricant from an aperture in the nozzle.

17. The method of claim 16, wherein the diameter of the conduit is between 2 and 4.5 fold greater than the diameter of the nozzle gas bore.

18. The method of claim 16, wherein the diameter of the nozzle gas bore is between 90% and 110% of the inner diameter of the inner lubricant tube.

* * * * *